United States Patent [19]

Nakajima

[11] Patent Number: 5,115,961

[45] Date of Patent: May 26, 1992

[54] APPARATUS FOR ASSEMBLING MAGNETIC DISK CARTRIDGE AND METHOD OF PRODUCING SAME

[75] Inventor: Saburo Nakajima, Kanagawa, Japan

[73] Assignee: Fuji Photo Film Co., Ltd., Kanagawa, Japan

[21] Appl. No.: 743,064

[22] Filed: Aug. 9, 1991

[30] Foreign Application Priority Data

Aug. 15, 1990 [JP] Japan .................. 2-214334

[51] Int. Cl.⁵ ................ B23K 20/10; B29C 65/08
[52] U.S. Cl. .................... 228/111; 228/1.1; 156/73.1; 156/580.1
[58] Field of Search ............. 228/110, 111, 219, 1.1, 228/20, 42; 156/73.1, 580.1

[56] References Cited

U.S. PATENT DOCUMENTS 3,477,119  11/1969  Smith ................ 156/580.1
3,493,448  2/1970   Powell et al. ......... 156/580.1
4,971,648  11/1990  Doering ............... 228/1.1

FOREIGN PATENT DOCUMENTS 583893  12/1977  U.S.S.R.

Primary Examiner—Samuel M. Heinrich
Attorney, Agent, or Firm—Sughrue, Mion, Zinn, Macpeak & Seas

[57] ABSTRACT

An apparatus and process for attaching a liner to a shell of a magnetic disk cartridge. A cover is provided that covers at least a portion of the liner and shell when in an attachment position. The cover has blow-out holes which are positioned around the periphery of the welding head of a welding device. Pressurized air is introduced into the blow holes so as to lift out any dust located in the vicinity of the half shell. An exhaust hole is provided in the cover for removal of the dust by virtue of a suction device.

6 Claims, 5 Drawing Sheets

APPARATUS FOR ASSEMBLING MAGNETIC DISK CARTRIDGE AND METHOD OF PRODUCING SAME

BACKGROUND OF THE INVENTION

1. Field of the Invention

This invention relates to an apparatus for assembling a magnetic disk cartridge and a method of producing the same. More specifically, the invention relates to an assembling apparatus for continuously moving a shell together with a liner placed on the shell and for welding (fusingly bonding) the liner to the shell by an ultrasonic welding device, and to a production method using this assembling apparatus.

2. Description of the Prior Art

For the purposes of easy handling and protection from dust, a disk-shaped recording medium, such as a magnetic disk, is conventionally housed in a relatively rigid cartridge case and loaded, together with this case, into a recording and reproducing device so as to record and reproduce desired information.

For example, as shown in FIG. 4, a 3.5-inch microfloppy disk is widely used for such a magnetic disk cartridge. A magnetic disk cartridge 1 includes liners 9 and 10 secured respectively to inner surfaces of upper and lower half shells 2 and 3 which are of a rectangular shape and molded of an ABS resin or the like. A magnetic disk 5 is rotatably interposed between the liners 9 and 10. The magnetic disk 5 is a flexible magnetic recording medium which comprises a polymeric film substrate of a disk-shape having a magnetic layer uniformly formed on a surface thereof. A ring-shaped center core 4 is fixed to a circular opening formed through the central portion of the magnetic disk 5. Formed through the central portion of lower half shell 3 is a opening 7 through which a motor shaft (not shown) is adapted to be inserted in a motor shaft insertion hole 4a of a generally square shape formed in the center core 4. Formed through each of upper and lower half shells 2 and 3 is a magnetic head insertion opening 8 into which a magnetic head (not shown) for writing and reading required information signals relative to the magnetic disk 5, as well as a magnetic pad, is adapted to be inserted.

Although not shown, a slide-type shutter for opening and closing the magnetic head insertion openings 8 is slidably mounted on a stepped portions 8a surrounding the openings 8, so that the shutter can protect the disk 5 and prevent dust from damaging the disk 5.

Usually, the liners 9 and 10 are welded to the half shells 2 and 3 using an assembling apparatus 105 as shown in FIG. 5. The assembling apparatus 105, has a conveyance system having, for example, a conveyor 108, and guide members 106 and 107 which guide the conveyor 108 and support the half shell 2 or 3 from below. This conveyance system intermittently conveys the half shell 2 or 3 in a predetermined direction. An ultrasonic welding device is provided at a predetermined position, and a welding horn head 110 of this ultrasonic welding device presses the liner 9 or 10 against the half shell 2 or 3 from above. The assembling apparatus 105 welds the assemblies (each composed of the half shell and the liner), fed one after another by the conveyor 108, and conveys them to the next assembling step.

In such a conventional welding process, a relatively large amount of dust, such as powder of the resin of the half shell and the fibers of the liner, is produced by ultrasonic vibrations. Therefore, the dust is drawn by a suitable means, and for example, as shown in FIG. 5, the dust is drawn from exhaust hoods 111 which are provided on the upper surfaces of guide members 106 and 107 and are disposed close to the welding horn head 110. Naturally, this exhaust system includes pipes 112, a exhaust pump 114, a filter 113, as well as other components.

However, most of the above-mentioned dust is fibrous dust produced from the liners 9 and 10. In addition, static electricity is produced by the contact between the welding horn head 110 and the assemblies (the half shell and the liner), the contact between the half shell 9 or 10 and the conveyor 108, the sliding contact between the conveyor 108 and the guide members 106 and 107, and other moving contact of the device. Thusly, the welding horn head 110, guide members 106 and 107 and the surrounding parts are statically charged. As a result, at those places where the force due to static electricity is stronger than the suction force of the exhaust hoods 111, the fibrous dust remains adhered to such places and eventually accumulates into large wooly deposits. These large wooly deposits of dust will eventually drop due to vibrations resulting from the driving of the apparatus 105. Such a large lump of dust is likely to become clogged in the pipe 112 of the exhaust system, or become lodged in slits or small holes formed in a cover when such a cover is provided on the exhaust hood 111, thus causing various problems. Also, if such deposits of dust intrude in between the conveyance system and the half shell, the half shell 2 or 3 may not be conveyed properly, thus causing problems in the manufacturing of the disk cartridge 1.

Further, if such deposits of dust fall and deposit on the inner surface of the half shell 2, 3, it would adversely affect the recording and reproducing function of the magnetic disk cartridge 1. Therefore, the assembling apparatus 105 must be frequently cleaned, and this maintenance is laborious. In addition, each time the maintenance is carried out, the assembling apparatus 105 must be stopped, which lowers productivity.

In view of the foregoing, it may be considered advisable to enhance the suction ability of the exhaust hood 111. However, if the suction force is increased, the liners 9, 10 are often displaced out of position by this suction force, so that proper welding cannot be accomplished.

SUMMARY OF THE INVENTION

Accordingly, it is an object of the subject invention to provide an apparatus for assembling a magnetic disk cartridge and a method of producing the same, in which dust can be drawn effectively, without displacing the liner out of position, thereby enabling satisfactory assembly of the cartridge and also improving productivity.

The above object of the present invention has been achieved by an apparatus for assembling a magnetic disk cartridge wherein a half shell is continuously moved by a conveyor, with a liner placed on an inner surface of the half shell, and the shell and the liner are welded together by an ultrasonic welding device. The inventor has a casing covering the portion of a path of travel of the disk cartridge disposed in the vicinity of an outer periphery of a welding horn head of the ultrasonic welding device. Blow-out holes which are opened downwardly so as to intermittently blow out the air are provided at least adjacent to the outer periphery of the ultrasonic welding horn head, and an exhaust hole for exhausting the air is provided on the side of the half shell.

Also, the above object has been achieved by a method of assembling a magnetic disk cartridge, utilizing the steps of continuously moving a half shell, having a liner placed thereon, by a conveyor, and welding the shell and the liner together by an ultrasonic welding device. Other steps include blowing the air generally vertically downward toward the shell from an area around an outer periphery of a welding horn head of the ultrasonic welding device, stopping the conveyor and also stopping the blowing immediately before the welding horn head descends to be contacted with the liner, and again blowing the air and also continuously exhausting the air from an exhaust hole after the welding horn head completely descends.

One preferred embodiment of the present invention will now be described with reference to the accompanying drawings.

DETAILED DESCRIPTION OF THE PREFERRED EMBODIMENT

Figure 1:
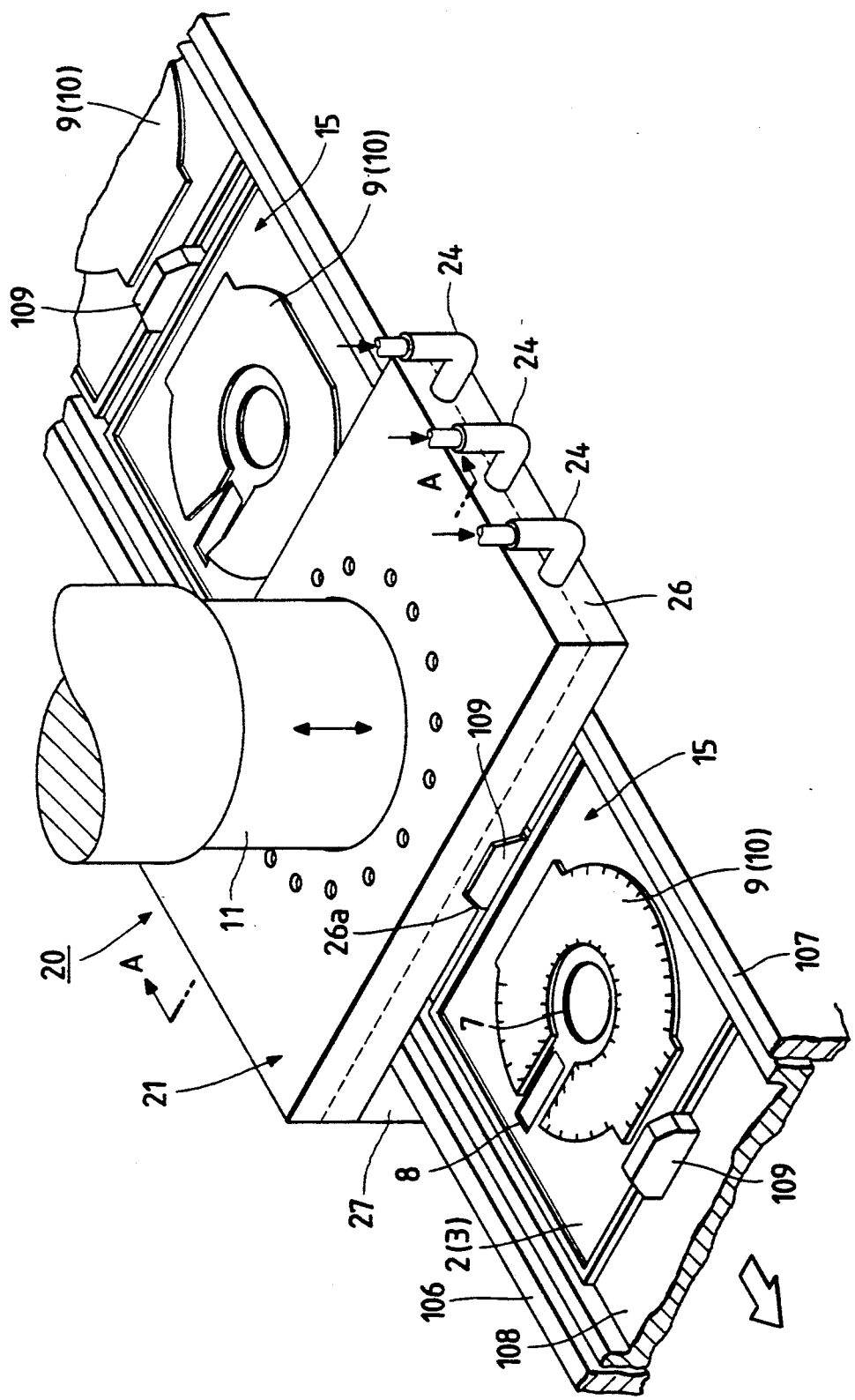
FIG. 1 is a perspective view of a preferred embodiment of an apparatus for assembling magnetic disk cartridges of a 3.5-inch micro-floppy disk-type of the present invention.
Figure 2:
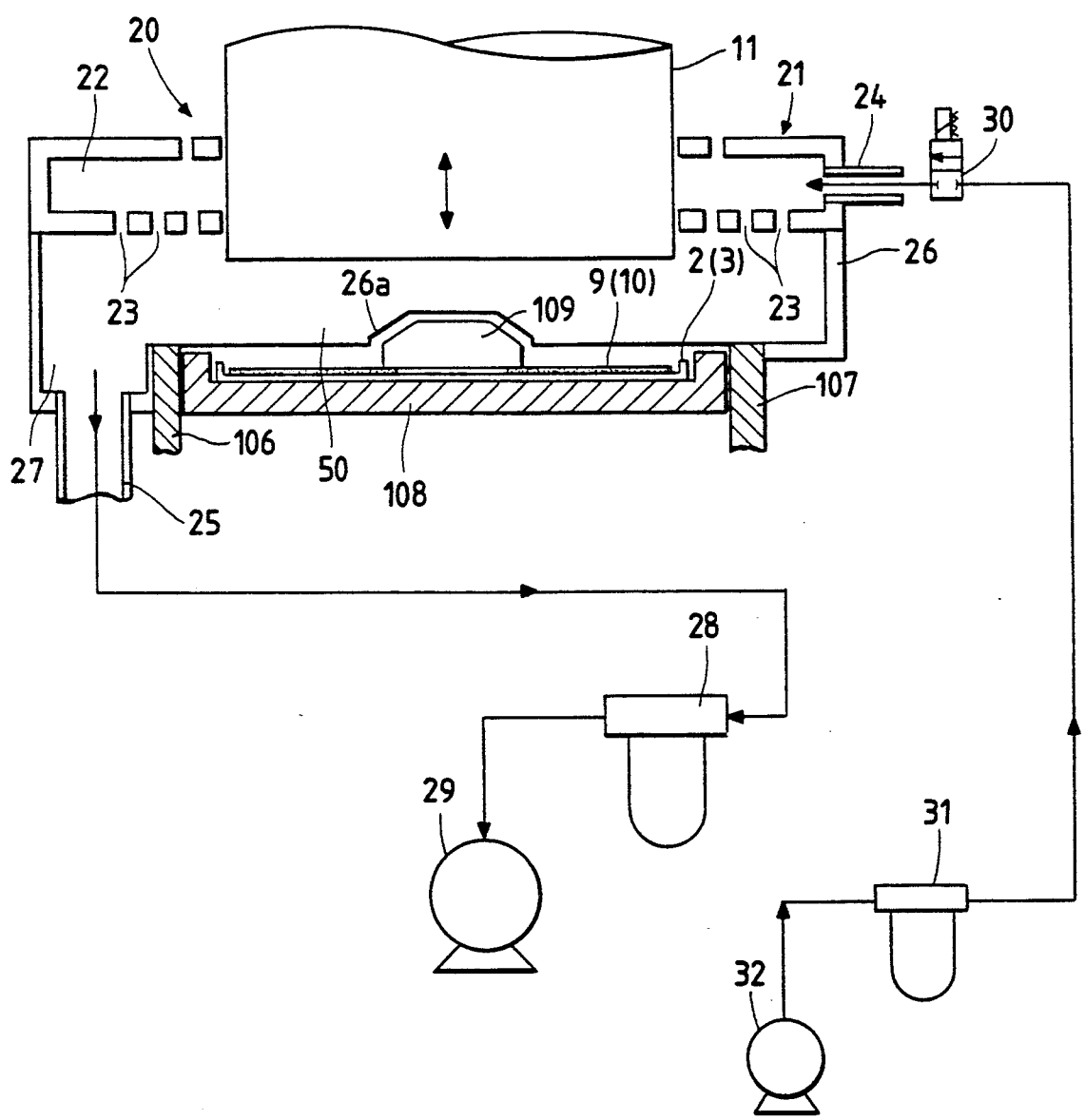
FIG. 2 is a schematic cross-sectional view of the preferred embodiment taken along the line A—A of FIG. 1.

FIGS. 1 and 2 illustrate the preferred embodiment of the present invention. In an assembling apparatus 20 of this embodiment, assemblies 15 each composed of a half shell 2 or 3 (hereafter only a lower half shell 2 and a liner 9 will be discussed as an upper half shell 3 and a liner 10 are assembled identically) of a magnetic disk cartridge 1 and the liner 9 or 10 placed on the inner surface of the half shell 2 are conveyed by a conveyor 108. In the conveyor 108, the half shell 2 is held in position, for example, by positioning members 109 projectingly formed on the conveyor 108. The conveyor 108 intermittently moves the assemblies to stop them at suitable intervals corresponding to the position of welding horn head 11 of an ultrasonic welding device provided at a suitable position so as to be opposed to the assembly 15.

A feature of this embodiment is that a casing 21 which covers the path of travel of the assembly 15 and allows the upward and downward movement of the welding horn head 11 is provided in surrounding relation to the outer periphery of the welding horn head 11. The casing 21 is so constructed as to effect the supply and exhaust of the air, as later described.

As shown in FIG. 2, the casing 21 includes an air intake chamber 22 having air blow-out holes 23 which are opened downward and are provided around the outer periphery of the welding horn head 11, a cover wall portion 26 covering the lower side of an intake chamber 22, and an exhaust chamber (exhaust hole) 27 for exhausting the air within the cover wall portion 26. The exhaust chamber 27 is disposed on the side of conveyor 108 serving as the support surface for the half shell 2. A filter 28 and a blower 29 are connected to the exhaust chamber 27 so that the exhaust can be effected by a suitable suction. Preferably, the lower end of the welding horn head 11 should not move into the intake chamber 22.

A plurality of the air blow-out holes 23 are provided around the entire periphery of the welding horn head 11. A plurality of the air intake pipes 24 are connected to the air intake chamber 22, and a valve 30 is mounted on a suitable portion of each air intake pipe 24. For example, the valve 30 is designed to be electrically operated so as to be easily opened and closed by a solenoid valve or the like. Clean air is supplied to the air intake pipes 24 from a compressor 32 via a filter 31.

Notches 26a are formed in the cover wall portion 26 so as to allow the passage therethrough of positioning members 109. Preferably, no gap should be the provided between this cover wall portion 26 and the conveyance system. The manner of fixing the casing 21 is not particularly limited, and for example the casing 21 may be fixed to guide members 106 and 107, or may be fixed by other fixing members which will not be affected by mechanical vibrations of the conveyance system and the ultrasonic welding device.

The method of operating the assembling apparatus 20 of the preferred embodiment will now be described with reference to the timing chart of FIG. 3.

In the step of blowing the air generally vertically downward from the air blow-out holes 23 toward the shell 2, immediately before the welding horn head 11 descends to be contacted with the liner 9 (timing a), the conveyor 108 is stopped, and also the valves 30 are closed to stop the blowing from the blow-out holes 23. This condition continues until the welding horn head 11 completely descends, and after the head 11 completely descends, the blowing of the air is resumed (timing b). Then, at the time (timing c) when the welding is completed, the welding horn head 11 is moved upward, and then the conveyor 108 is again moved to bring the next assembly 15 to the position beneath the welding horn head 11. On the other hand, during the above welding cycle, the air is continuously exhausted from the exhaust chamber 27.

Figure 3:
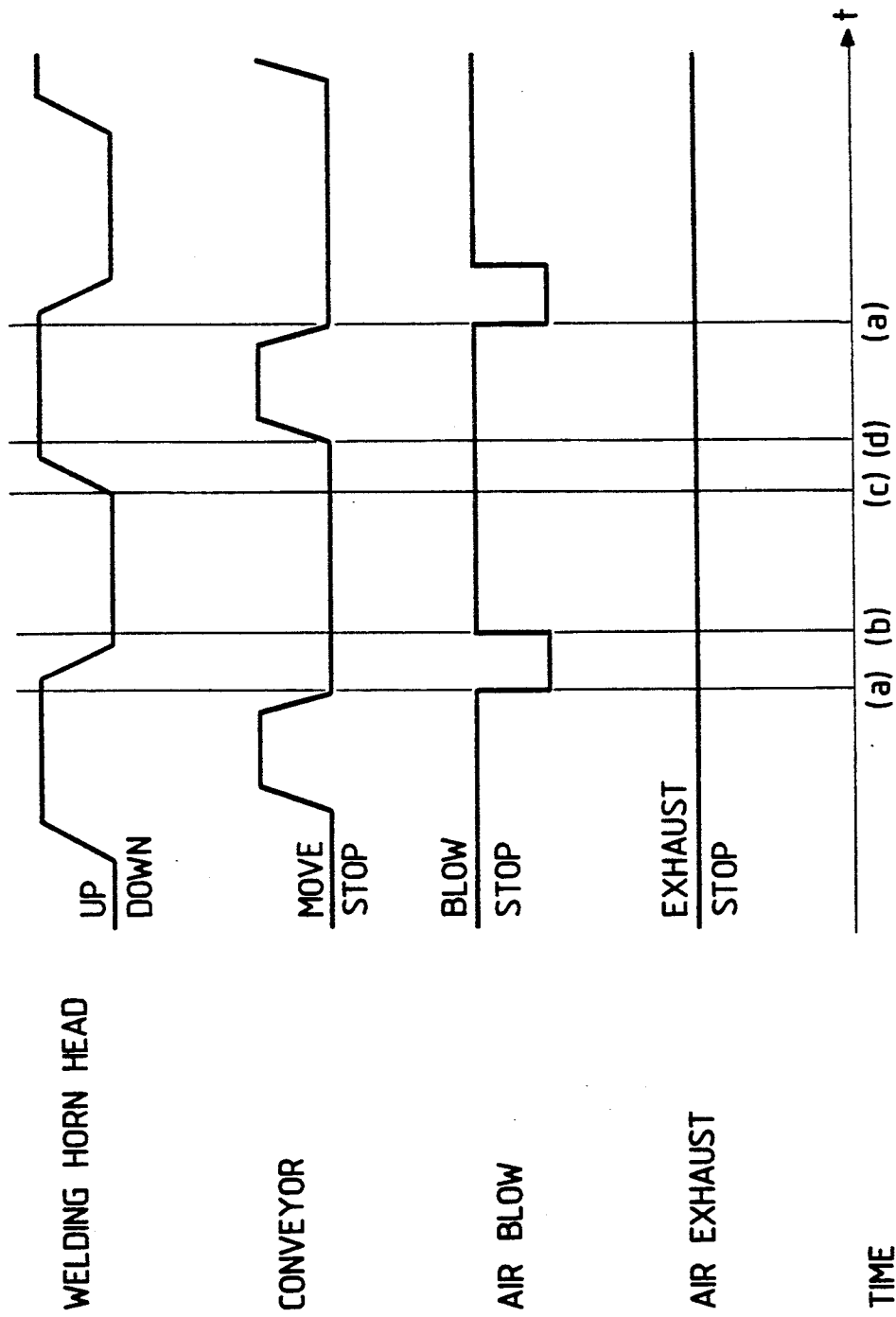
FIG. 3 is a timing chart showing the operation of the assembling apparatus of FIG. 1.
Figure 4:
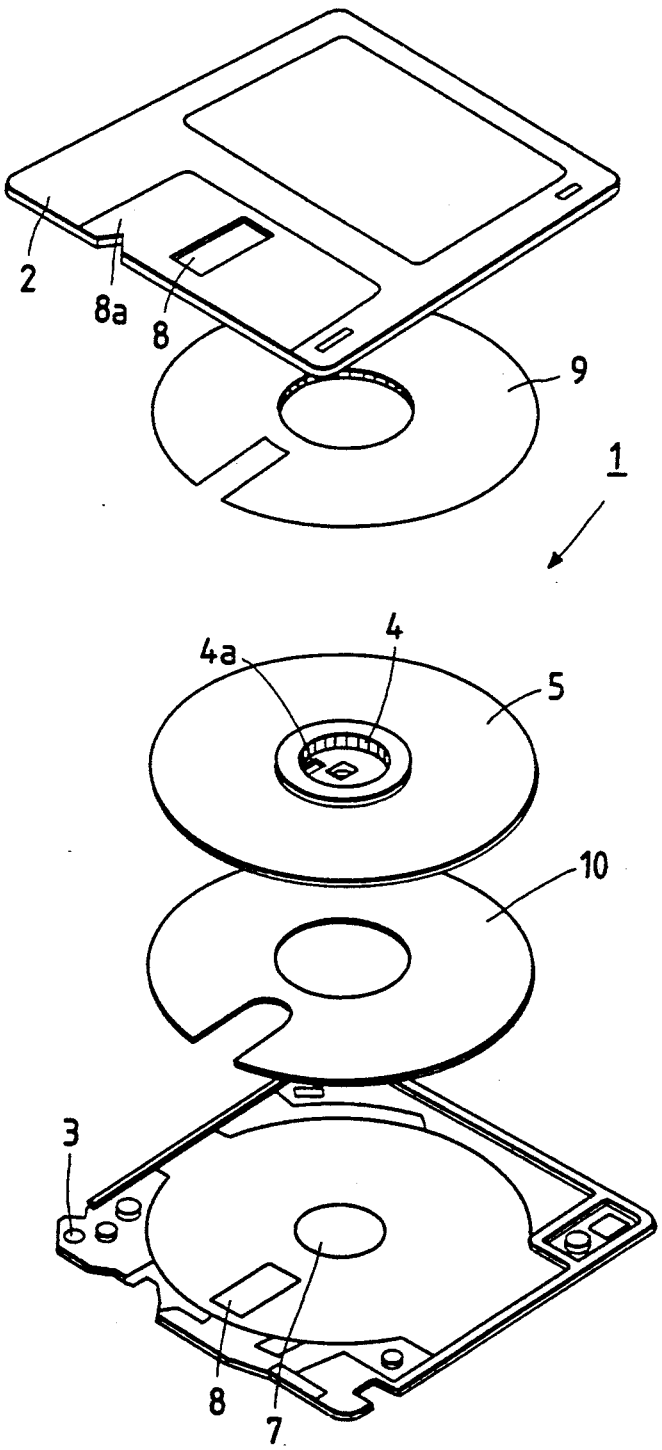
FIG. 4 is a known 3.5-inch micro-floppy disk for a magnetic disk cartridge.
Figure 5:
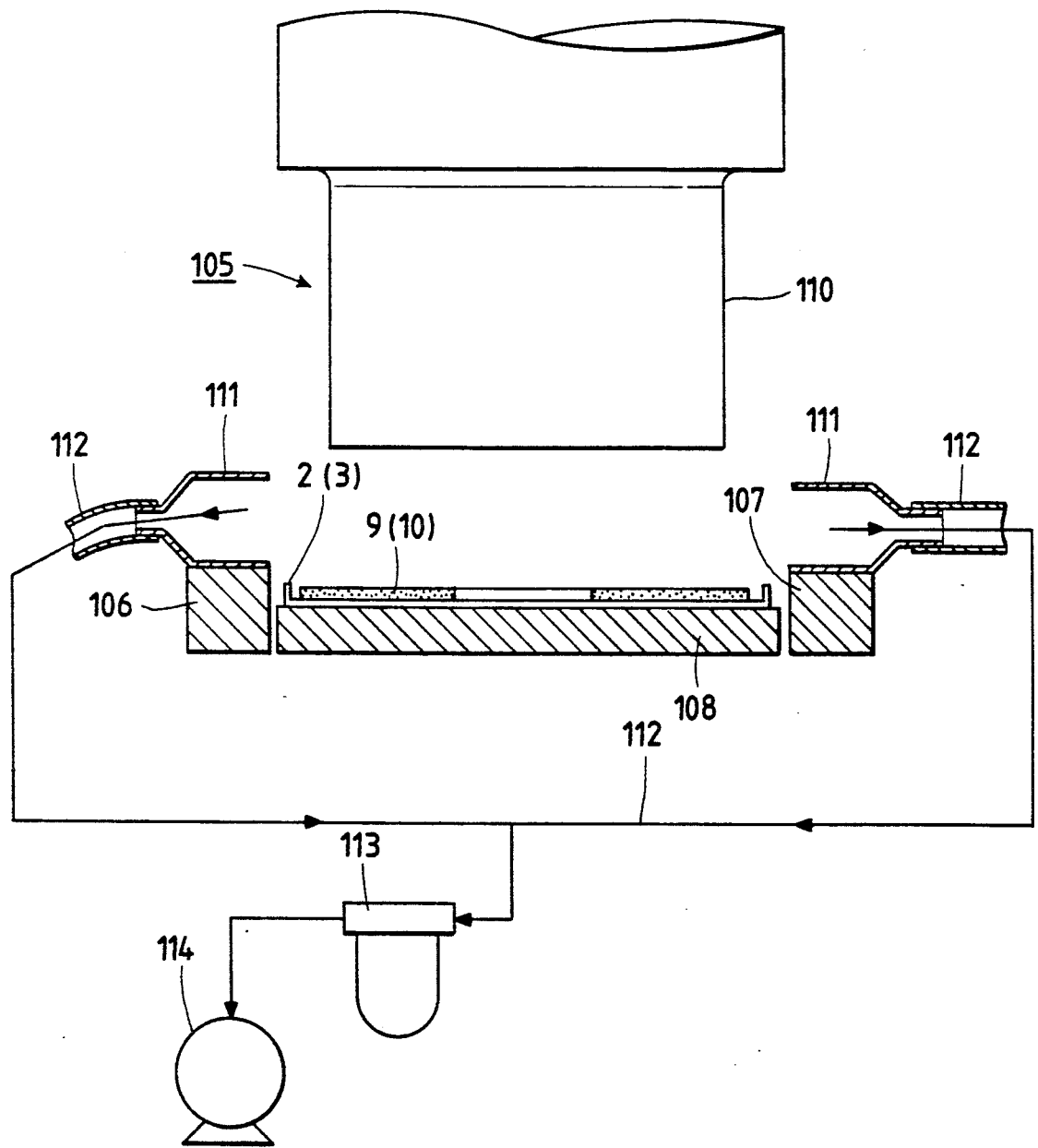
FIG. 5 is a sectional view showing a conventional welding apparatus by which dust is drawn.

Incidentally, the timing of stopping the blow-out of the air and the timing of moving the horn head 11 upward or downward are not required to be in strictly accord with those shown in FIG. 3, and slight modifications may be desirable. Also, no problem arises even if the timing of stopping the air blow-out is modified.

As described above, by blowing air from the air blow-out holes 23 toward the assembly 15 in such a manner that the air impinges on the assembly 15, dust can be effectively blown off. In the condition in which the welding horn head 11 is positioned below the air intake chamber 22 (at the time of the upward or the downward movement thereof), there is produced an air flow pattern different from that obtained when the welding horn head 11 is not extended into the air intake-exhaust space 50. Further, as described above, the blow-out of the air is stopped when the welding horn head 11 descends, and then the blow-out is resumed. By doing so, an effective turbulence of the air flow can be produced.

Further, even if the liner 9 is in a curled condition, the liner 9 will be urged against the shell 2 by the downward blow-out force of the air from the blow-out holes 23. Therefore, even if the exhaust is made strong, the displacement of the liner 9 out of position can be effectively prevented.

Thus, over the entire welding cycle, the air flow within the air intake-exhaust space 50 is changed, and therefore the dust is lifted and effectively drawn so that dust removal can be effected satisfactorily with a few exhaust holes and also with a relatively small suction force.

As described above, in the present invention, the casing 21 covers that portion of the path of travel of the disk cartridge 1 disposed in the vicinity of the outer periphery of the welding horn head 11. In addition, the air blow-out holes 23 which open downwardly, are provided at least around the entire outer periphery of the welding horn head 11. Therefore, the dust can be effectively blown off by the air blown from blow-out holes 23, and the blown dust can be continuously exhausted and removed from the exhaust hole 27. Further, even if the liner 9 on the half shell 2 is in a curled condition, the liner 9 can be urged against the shell 2 by the downward blow-out force of the air from the blow-out holes 23, and therefore the liner 9 will not be displaced out of position by the exhaust suction.

In the method of the present invention, the blowing of the air from blow-out holes 23 and the stopping of this blowing are repeated at suitable intervals coordinated to the upward and downward movement of the welding horn head 11. Accordingly, the air flow in the air intake-exhaust space 50 formed by the casing 21 can be changed over the entire welding cycle. Therefore, the dust can be effectively lifted, and the dust removal can be effected satisfactorily without providing many exhaust holes and without increasing the suction. In addition, the liner 2 is not displaced out of position by the drawing of the dust, and the cartridge 1 can be assembled quite satisfactorily. By virtue of this effective dust removal, it is not necessary to stop the apparatus when carrying out the dust removal operation as is the case with the prior art, and therefore the productivity is improved.

The present invention is not limited to the above embodiment but can include many modifications without departing from the scope and spirit of the invention as recited in the appended claims. For example, the shape of the casing 21, the position and number of exhaust chamber 27, and the structure of the conveyance system can be suitably modified. The valve 30 may be operated by other than electrical means, for example, a pneumatic cylinder, or the like.

What is claimed is:

1. An apparatus for attaching a liner to an inner surface of a half shell of a magnetic disk cartridge, comprising:
   a welding device for welding the liner to the half shell, said welding device is capable of moving into and out of a welding position;
   a casing disposed proximate the periphery of said welding device when said welding device is in said welding position, said casing covering at least a portion of said half shell and said liner, when said half shell and said liner are in an attachment position;
   said casing having a plurality of blow out holes formed thereon opposite said inner surface of said half shell when said half shell is in said attachment position, said casing also having an exhaust hole;
   a positive pressure device in communication with said blowout holes so as to force a fluid through said blowout holes into a space defined by said casing and said half shell when said half shell is in said attachment position; and
   a vacuum device in communication with said exhaust hole so as to exhaust said fluid from said space.

2. An apparatus as claimed in claim 1 wherein said welding device is of an ultrasonic type.

3. An apparatus as claimed in claim 1, further comprising:
   a conveyance mechanism for conveying the half shell and said liner into and out of said attachment position and for conveying additional liners and half shells to said attachment position in a consecutive manner.

4. An apparatus as claimed in claim 3 wherein the movement of said welding device out of said welding position allows said conveyance mechanism to convey the additional half shells and liners to said attachment position and also changes flow characteristics of said space so as to cause turbulent flow of said fluid therein.

5. An apparatus as claimed in claim 1 wherein at least some of said blowout holes are located adjacent said periphery of said welding device.

6. A process for attaching a liner to an inner surface of a half shell of a magnetic disk cartridge comprising the steps of:
   blowing a fluid toward an attachment position;
   conveying said liner and said half shell to said attachment position;
   ending said blowing step;
   placing a welding device proximate said liner and welding said liner to said half shell;
   exhausting said fluid from an area proximate said attachment position;
   continuing said blowing step;
   moving said welding device away from said liner;
   conveying said liner and said half shell away from said attachment position.

* * * * *